Feb. 16, 1932.  A. NYMAN  1,845,174
ELECTRICAL CONDENSER
Original Filed April 2, 1926
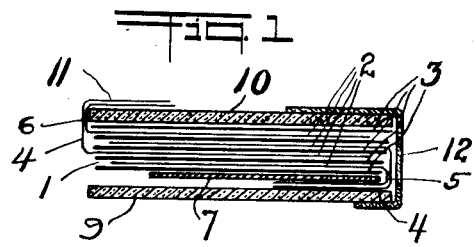
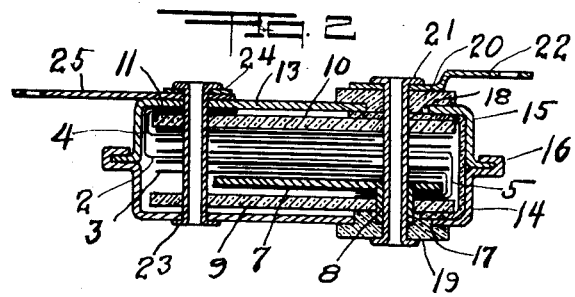
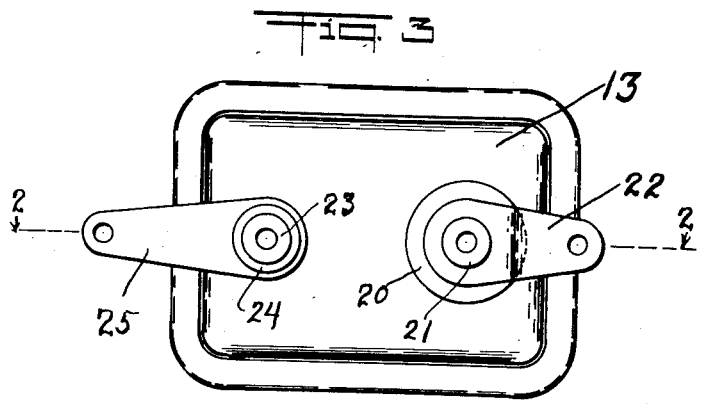
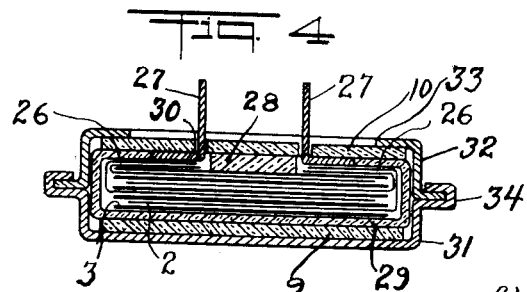
INVENTOR
Alexander Nyman
BY
William F. Nickel
ATTORNEY Patented Feb. 16, 1932

1,845,174

UNITED STATES PATENT OFFICE

ALEXANDER NYMAN, OF DOBBS FERRY, NEW YORK, ASSIGNOR TO DUBILIER CONDENSER CORPORATION, OF NEW YORK, N. Y., A CORPORATION OF DELAWARE

ELECTRICAL CONDENSER

Application filed April 2, 1926, Serial No. 99,363. Renewed July 6, 1931.

This invention relates to condensers, and more particularly to fixed condensers.

An object of the invention is to provide a fixed condenser encased in a dust and moisture proof container.

Another object of the invention is to provide a fixed condenser enclosed within a container designed to apply pressure to the assembly in a simple and efficient manner.

Another object of the invention is to provide a fixed condenser, the stack of which is assembled between corresponding pressure plates so mounted and secured within a container as to produce an even distribution of pressure.

Another object of the invention is to provide a fixed condenser having an assembly comprising a stack mounted between compression plates, the assembly being encased within a container, with terminals firmly attached and easily accessible.

Another object of the invention is to provide a fixed condenser having a stack assembly enclosed in an insulating covering encased within a metallic container, the terminals of the stack protruding from the container in an easily accessible position and being firmly attached to the tabs of the condenser plates.

With these and other objects in view, which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Figure 1 is a section of the assembly comprising a condenser stack, a bottom contact plate, the compression plates and a flexible insulation around one end;

Figure 2 is a vertical sectional view illustrating the assembly mounted with a container, taken on line 2—2 of Fig. 3;

Fig. 3 is a top plan view; and

Fig. 4 is a vertical sectional view of a modified form.

Referring by numerals to the drawings, 1 represents a condenser stack comprising a plurality of condenser plates 2 and intermediate dielectric sheets 3. The dielectric sheets consist of thin mica sheets cut or trimmed to uniform size. The condenser plates are shaped from tin foil in proper proportion for use with the dielectric sheets. The condenser plates are formed with tabs or end portions 4, by means of which the plates are connected in parallel.

The condenser plates are arranged in groups, as indicated at 5 and 6. The tabs 4 upon the ends of the plates in group 5 are folded under in close contact with each other and with a copper contact plate 7 having a flanged sleeve 8 passing through registering apertures in the tabs. The stack so assembled is placed between corresponding insulating plates 9 and 10, with the sleeve 8 engaging an aperture in the plate 9. The tabs upon the plates in group 6 are folded, as indicated at 11. The assembly thus arranged is protected at one end by a flexible insulation strip 12 the ends of which are lapped upon the plates 9 and 10.

The assembly constructed in the manner above described is enclosed in a metallic container 13. The container 13 comprises corresponding shallow pan-like members 14 and 15 crimped together, as indicated at 16, along a central line between the top and bottom sections. The closing and crimping of the container is effected under pressure; thus the plates 9 and 10 function as bearing plates or pressure blocks, imparting a uniformity of pressure to the stack. The plates are firmly bound or held in position by the container and by the securing means or the terminals to be hereinafter described.

One end of the container has oppositely disposed apertures 17 and 18 in which are mounted insulating bushings 19 and 20. The bushings 19 and 20 bear against the pressure plates 9 and 10 respectively. The diameter of the bores in the bushings is the same as the inner diameter of the sleeve 8. The bores in the bushing and sleeve register. A like bore extends through the assembly to permit the insertion of a rivet or grommet 21. The ends of the rivet are turned or upset upon the bushings, and beneath one end of the rivet is secured a terminal 22.

Through the other end of the container and the encased assembly is a vertical bore in which is secured a rivet or grommet 23 having a washer 24 which secures between itself and the container a terminal 25. It is to be noted that the terminal 25 makes contact through the container with the tabs upon the condenser plates 6. The tabs also contact with the container and both the terminal and the tabs are firmly held in position by the rivet 23 which acts as a binder.

In Fig. 4 I have shown a modified form wherein the condenser stack is assembled in substantially the same manner as previously described. The tabs on both groups of condenser plates are folded over upon the top sheet of dielectric, as indicated at 26. The tabs contact with corresponding angular shaped terminals 27, with a compression plate 28 interposed. The stack thus formed is enclosed in a flexible insulating casing 29 mounted between corresponding pressure plates 9 and 10. The plate 10 is provided with slots 30 for the reception and protrusion of the terminals.

The assembly thus constructed is enclosed within a container consisting of a pan-like member 31 having a top member 32, cut away as shown at 33. The bottom and top members are crimped together, as indicated at 34, along a central line. The crimping is of such a character as to create and maintain a pressure between the insulating plates.

The simplicity of the condenser constructed in accordance with the alternate form is striking, yet still further simplicity of construction may be obtained by omitting the bottom plates. Such omission might readily be effected without materially impairing the efficiency of the condenser.

In the form shown in Figs. 1, 2 and 3, the pressure plates 9 and 10 may be omitted in instances where simplicity and economical manufacture becomes a predominant feature. In such instances where the omission of the pressure plates is thought to be advisable or desirable, it may be found necessary to strengthen the structure of the container by the employment of material of a heavier gauge, in order that the container will be rigid and hence will maintain a more uniform pressure upon the stack.

While I have shown and described the preferred embodiments of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

While the container 13 and the container shown in Figure 4 are described as of metal, they may also be of insulation such as rubber, phenolic condensation products or other suitable materials.

Having described my invention, what I believe to be new and desire to secure and protect by Letters Patent of the United States is:—

1. A condenser comprising a container, a condenser stack between compression plates mounted within the container, a contact plate connected to one group of condenser plates, the other group of condenser plates contacting with the container, terminals contacting respectively with the contact plate and container, and means for locking the container in a closed position.

2. A condenser comprising a container formed in two parts crimped together, a condenser stack with compression plates mounted within the container under pressure, rivets passing through the ends of the container and stack, one of the rivets contacting with one set of condenser plates and the other rivets contacting with the other set of condenser plates, and terminals secured by the rivets.

3. A condenser comprising a two-part container crimped together, a condenser stack with compression plates mounted in the container under pressure, a contact plate for one group of condenser plates, the other group of condenser plates contacting with the container, rivets extending through the container and stack, one of the rivets contacting with one group of plates, the other rivet contacting with the contact plate, and terminals attached by the rivets.

4. A condenser comprising a two-part container crimped together, a condenser stack and compression plates mounted in the container under pressure, one group of condenser plates contacting with the container, a contact plate secured by a flange sleeve to the other group of condenser plates, a flexible insulating cover over one end of the stack, rivets extending through the ends of the container and enclosed stack, one rivet passing through the sleeve contacting with one group of plates, the other rivet contacting with the group of plates in contact with the container, and terminals supported by the rivets.

5. A condenser including a stack, a bearing plate for the stack, a metallic container completely enclosing said stack and plate, and clamping means passing through the container and exerting pressure on the bearing plate, and means for insulating said clamping means from the container.

6. A condenser comprising a stack, bearing plates for the stack, a separable container completely enclosing said stack and plates, clamping members passing through the opposite sides of the container for exerting pressure on the bearing plates, each of the clamping members comprising a terminal for the condenser.

7. A condenser comprising a stack, bearing plates of insulation disposed on opposite sides of the stack, a metallic container completely enclosing said stack and plates, clamping members passing through the stack, bearing plates and container, the clamping members serving as connecting means for the stack, and means for insulating certain of the clamping members from the container.

In testimony whereof I affix my signature.

ALEXANDER NYMAN.